United States Patent [19]

Kiyokawa et al.

[11] Patent Number: 4,797,811
[45] Date of Patent: Jan. 10, 1989

[54] DUAL LANGUAGE NUMERICAL CONTROLLER

[75] Inventors: Morio Kiyokawa; Akihiko Fujimoto, both of Aichi, Japan

[73] Assignee: Mitsubishi Denki Kabushiki Kaisha, Tokyo, Japan

[21] Appl. No.: 30,295

[22] Filed: Mar. 23, 1987

Related U.S. Application Data

[63] Continuation of Ser. No. 592,491, Mar. 22, 1984, abandoned.

[30] Foreign Application Priority Data

Mar. 22, 1983 [JP] Japan ................................. 58-47475

[51] Int. Cl.⁴ .......................... G05B 19/02; G06F 9/06
[52] U.S. Cl. ..................................... 364/200; 364/900; 364/474.23
[58] Field of Search ... 364/200 MS File, 900 MS File, 364/191, 474.23, 171

[56] References Cited

U.S. PATENT DOCUMENTS

| | | | |
|---|---|---|---|
| 3,271,743 | 9/1966 | Craft et al. | 364/900 |
| 3,975,622 | 8/1976 | Horn et al. | 364/900 |
| 4,165,534 | 8/1979 | Dummermuth et al. | 364/900 |
| 4,209,847 | 6/1980 | Noda et al. | 364/900 |
| 4,302,820 | 11/1981 | Struger et al. | 364/900 |
| 4,381,551 | 4/1983 | Kanou et al. | 364/900 |
| 4,443,865 | 4/1984 | Schultz et al. | 364/900 |
| 4,466,057 | 8/1984 | Houseman et al. | 364/200 |
| 4,484,286 | 11/1984 | Nagamine et al. | 364/900 |

FOREIGN PATENT DOCUMENTS 0086843 of 0000 European Pat. Off. .

Primary Examiner—Gary V. Harkcom
Assistant Examiner—Christopher H. Lynt
Attorney, Agent, or Firm—Sughrue, Mion, Zinn, Macpeak & Seas

[57] ABSTRACT

A dual language numerical controller includes a terminal (8′) for entering both a numerical control (NC) language program and a higher level language, such as BASIC, program, a language discriminator (31) for determining which language has been entered, a higher level language interpreter (32) and an NC language interpreter (33), both for producing NC instruction data and an NC data table formatter (34) for arranging the instruction data in the order of which the entered programs produced them.

12 Claims, 2 Drawing Sheets

DUAL LANGUAGE NUMERICAL CONTROLLER

This is a continuation of application Ser. No. 592,491 filed Mar. 22, 1984, now abandoned.

BACKGROUND OF THE INVENTION

The invention relates generally to a controller for a numerical control device, and it relates in particular, to a controller that simultaneously processes a numerical control language and a higher level language.

The term "NC" as used herein means numerical control. The term "NC language" as used herein is intended to mean an NC instruction language that has a format peculiar to numerical control for operating a numerical control device, and the term "high level language" is a general purpose language such as a BASIC language.

FIG. 1 is a block diagram outlining the arrangement of a conventional numerical control device. In FIG. 1, an NC tape 1 contains a machining program in the NC language. An input section 2 comprises a reading circuit and a command decoding and processing circuit. The control device further comprises a control section 3, a memory section 4, a processor section 5, an output section 6, a machine tool 7 to be controlled, a BASIC language terminal 8 which sets and displays the BASIC language, and a change-over switch 9.

The operation of the device will be briefly described. In the case where control is effected using an NC language, an example of which is shown in Table 1, before the operation is started the change-over switch 9 is set to select the input section 2 so that the input section 2 reads the machining program on the NC tape 1. The program is interpreted by the control section 3, and the processor 5 carries out the necessary calculations according to the interpreted program. The resultant data of the calculation are stored in the memory section 4. The data thus stored are successively applied through the output section 6 to the machine tool 7, so that the tool is controlled according to the program. This control is carried out for each axis of the machine tool 7.

On the other hand, in the case where it is required to control the machine tool by using a BASIC language program, an example of which is shown in Table 2, it is necessary to set the change-over switch 9 in advance. In this case, the switch 9 is set to select the BASIC terminal 8, and the operator operates the keyboard at the terminal 9 to prepare a control program in a BASIC language while viewing a CRT (cathode ray tube) display unit, so that the machine tool is controlled according to the control program thus prepared.

As is apparent from the above description, in the conventional device shown in FIG. 1, NC language instructions are inputted from the NC tape 1 through the input section 2 to the control section 3, and BASIC language instructions are inputted from the BASIC terminal 8 to the control section. Therefore, the control section 3 is required to detect the state of the change-over switch 9, i.e., whether the switch 9 is connected to the input section 2 or the BASIC terminal 8, thereby to determine what language is used for the instruction. The machine tool is controlled according to the instruction in the language thus determined.

With the conventional NC device, the control is effected according to NC language instructions or BASIC language instructions by operating the change-over switch 9; however, it is possible to control the machine tool by using two languages simultaneously. If in the case of a simple movement instruction for "Feed the X-axis 100 mm quickly", an NC language instruction such as "GOO X 1000D;" can be used. However, BASIC language instructions can be advantageously used in the case of a special cycle instruction such as a series of operations in which, as in a deep hole drilling cycle instruction, after being dropped quickly to a certain depth, the drill is advanced by predetermined incremental distances for drilling, and after the hole has been drilled to a predetermined depth, the drill is quickly returned to its original position. The advantages of the use of two languages lies in that the BASIC special cycle can be formulated as desired by the user and the NC language simple movement instruction can be readily executed because of the simple instruction format. However, the conventional device cannot use the two languages in this manner.

SUMMARY OF THE INVENTION

Accordingly, an object of this invention is to eliminate the above-described difficulty accompanying a conventional numerical control device. More specifically, an object of the invention is to provide a numerical control device in which, unlike the conventional NC device in which the NC tape 1 inputs only the NC language data and the BASIC terminal 8 inputs only the high level language data, the terminal section is so designed as to be able to input both NC language data and high level language data, whereby a program written in both NC language and high level language such as BASIC language can be used.

DETAILED DESCRIPTION OF THE PREFERRED EMBODIMENTS

Figure 2:
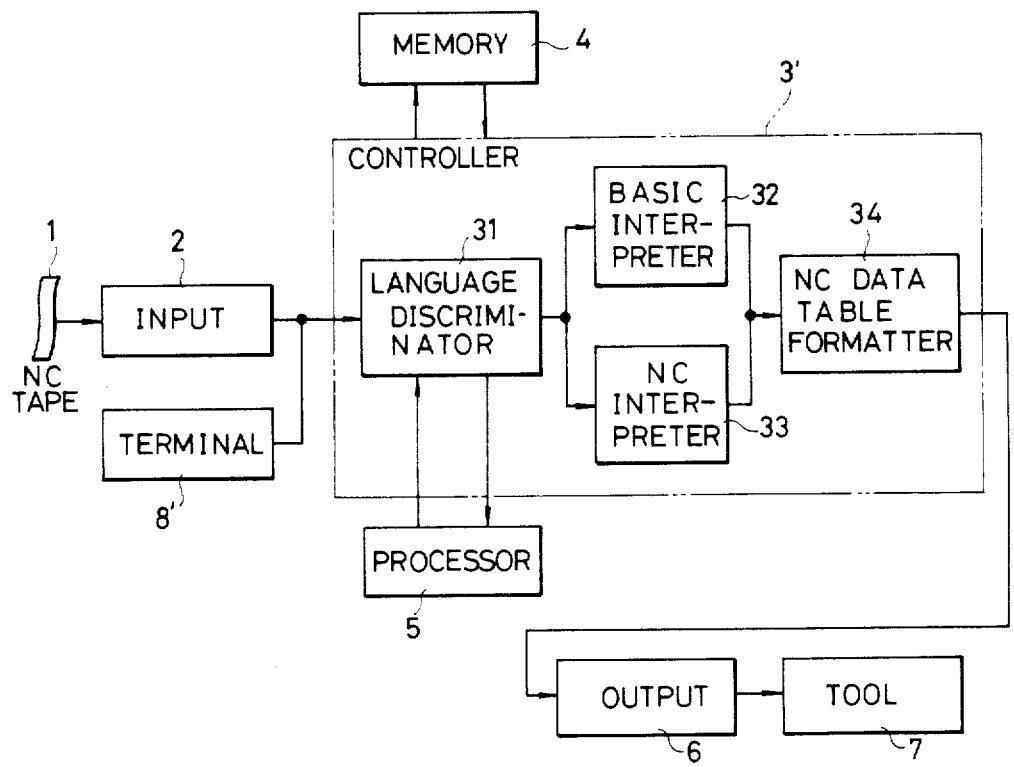
FIG. 2 is a block diagram showing the arrangement of one embodiment of a numerical control device according to this invention.

One example of a numerical control device according to this invention will be described with reference to FIG. 2.

Figure 1:
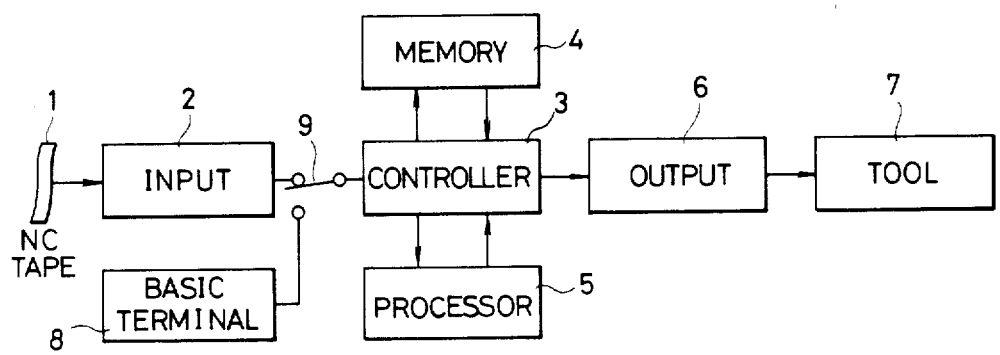
FIG. 1 is a block diagram showing the arrangement of one example of a conventional NC device.

The NC device of the invention is different from that shown in FIG. 1 in the following points: The change-over switch 9 in FIG. 1 is not used in the controller of the invention, and the input section 2 and a terminal 8' are connected directly to a control section 3' so that the terminal 8' can input both NC and BASIC languages. The control section 3' comprises a language discriminating section 31, a BASIC language interpreting section 32 which produces data in NC form, an NC language interpreting section 33 and an NC data table formatting section 43 which combines the NC data output from both the BASIC interpreter 32 and the NC interpreter 33.

Figure 3:
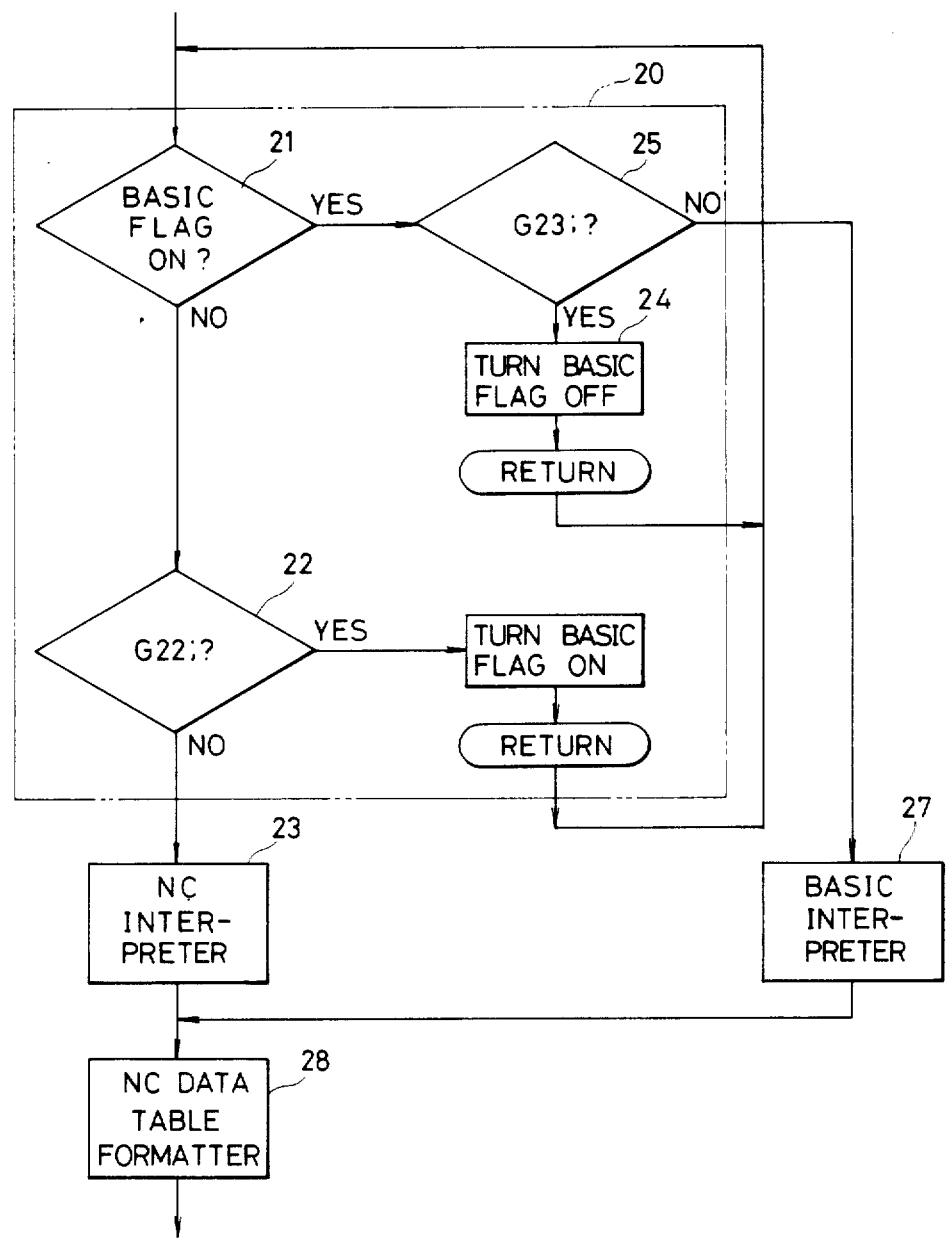
FIG. 3 is a flow chart describing the operation of the device in FIG. 2.

The operation of the device will be described with reference to a flow chart in FIG. 3. Input data from the NC tape 1 are identical to those in the conventional NC device shown in FIG. 1. It is assumed that the terminal 8' inputs a program containing, as shown in Table 3, both NC language and BASIC language.

First, the program is inputted into the control section 3' from the terminal 8' by operating the keyboard. The language discriminating section 31 determines whether or not the program inputted into the control section 3 has been written in the NC language. This language discrimination is accomplished by a series 20 of steps shown in the flow chart in FIG. 3. In step 21 it is determined whether or not the BASIC language processing flag is on. If not, the operation advances to step 22, in which it is determined whether or not the instruction is a BASIC start delimiter instruction which indicates that the following instructions are in the BASIC language. In the program shown in Table 3 the BASIC start delimiter is "G22". If, in step 22, the program is not a BASIC start delimiter, then it is determined that the program is in NC language, and the operation advances to step 23 where NC language processing or interpreting is carried out.

When, in step 22, a BASIC start delimiter instruction is detected, a G22 instruction in the example of Table 3, operation advances and the BASIC language processing flag is turned on in the language discriminating section 31, and operation then returns to step 21. Thus, it is determined that the instruction is in BASIC language.

When, in step 21 the BASIC language processing flag is found to be on, operation advances to step 25. In step 25, it is determined whether or not the program is a BASIC end delimiter instruction which indicates the end of BASIC instructions. More specifically, it is determined whether or not the program language is changed from the BASIC language. In the program in Table 3, the BASIC end delimiter instruction is "G23". When, in step 25 the instruction is found to be a BASIC end delimiter instruction, i.e., "G23;" in the example of Table 3, operation advances to step 24. In step 24, the BASIC language processing flag is turned off in the language discriminating section 31, and operation returns to step 21. It is thus determined that the following program is in NC language.

When in step 25 the program is not a BASIC end delimiter instruction, it is determined that the program is in BASIC language, and operation advances to step 27, in which BASIC language processing or interpreting is carried out.

When the language discriminating section 31 determines that the program is in NC language, then the operation advances to step 23. In step 23, the NC language interpreting section 33 interprets the NC language program, and in step 28 the NC data table formatting section 34 forms and NC data table. More specifically, in step 23 NC instruction data are formed according to the NC language instruction, and the instruction data thus formed are set sequentially as instructed to provide the NC data table in step 28.

When the language discriminating section 31 determines that the program is in BASIC in step 27 the BASIC language interpreter section 32 forms NC instruction data, and in step 28 the NC data table formatting section 34 forms an NC data table.

Accordingly, when a program written in both NC language and BASIC language as shown in Table 3 is inputted to the control section 3' by operating the keyboard in the terminal 8', the control section 3' carries out language discrimination and language processing, so that the NC instruction data are set as an NC data table in the order of both the BASIC and NC instructions. The NC data are then sequentially fed to the output section 6.

As is clear from the above description, a program written in both NC and BASIC language is interpreted by the control section 3', so that NC data are set as required, and finally the machine tool 7 is controlled by the output section 6 as intended.

Instead of the BASIC language, another high level language may be used for the NC device. In this general case, the BASIC interpreting section 32 is replaced by a high level language interpreting section which produces NC data.

As is apparent from the above description, according to the invention the terminal for inputting NC language instructions and high level language instructions is provided in the NC device, and the control section has the language discriminating section for determining whether a program is in NC language or in a high level language. The high level language interpreting section processes the high level language to produce NC data and the NC language interpreting section processes NC language. Therefore, the operation can readily use two kinds of languages simultaneously in programming. Furthermore, the numerical control device of the invention is advantageous in that programs can be simplified owing to the use of the NC language, but complex programs can be formed because of the use of high level language.

TABLE 1

| N1000 | G92 X0Z0 M03; |
|---|---|
| N1001 | G91 GO $Xx_1$ |
| N1002 | $Xx_2$; |
| N1003 | G1 $Xx_3$ $Ff_1$; |
| N1004 | GO $Xx_4$; |
| N1005 | GOX$-(x_2+x_3+x_4,)$; |
| N1006 | GO $Zz_1$; |
| N1007 | GO $Xx_2$; |
| N1008 | G1 $Xx_3$ $Ff_1$; |
| N1009 | GO $Xx_4$; |
| N1010 | GO X$-(x_2+x_3+x_4)$; |
| N1011 | GO $Zz_1$; |
| N1012 | GO $Xx_2$; |
| N1013 | G1 $Xx_3$ $Ff_1$; |
| N1014 | GO $Xx_4$; |
| N1016 | GO Z$-z_1$; |
| N1017 | GO X$-x_1$ Z$-z_1$ M05; |
| N1018 | M00; |

TABLE 2

| 100 | K=$C100; X=$C006; Z=$C00A |
|---|---|
| 110 | INPUT K(0), K(1), K(2), K(3) |
| 120 | INPUT K(4), K(10) |
| 130 | X(0)=0; Z(0)=0; G=92; M=03; A=03; C=$13 |
| 140 | GOSUB 1000 |
| 150 | X(0)=K(0); G=91; H=00; A=01; C=$07 |
| 160 | GOSUB 1000 |
| 170 | FOR I=1 TO 3 |
| 180 | X(0)=K(1); A=01; C=$01; GOSUB 1000 |
| 190 | X(0)=K(2); G=01; F=K(10); A=01; C=$03 |
| 200 | GOSUB 1000 |
| 210 | X(0)=K(3); G=00; A=01; C=$03 |
| 220 | GOSUB 1000 |
| 230 | X(0)= −(K(1)+K(2)+K(3)); A=01; C=$01 |
| 240 | GOSUB 1000 |
| 260 | Z(0)=K(4); A=02; C=$01; GOSUB 1000 |
| 270 | NEXT I |
| 280 | X(0)= −K(0); Z(0)= −3 K(4); A=$03 |
| 290 | M=05; C=$11; GOSUB 1000 |
| 300 | M=00; C=$11; GOSUB 1000; STOP |
| 1000 | POKE $C002, G; POKE $C003, H |
| 1010 | POKE $C005, A |
| 1020 | @($C00E)=F; @($C010)=M |
| 1030 | POKE $C001, C |
| 1040 | B=WPEEK($C000) |
| 1050 | IF B < > 1GOTO 1040 |
| 1060 | RETURN |

TABLE 3

(NC PROGRAM)
G 92X0X0Z0M03;
G 91GXx$_1$;
Xx$_2$';
.
.
.
G 22;
(BASIC PROGRAM)
FOR I=1 TO 3
X(0)=K(1); A=01
GOSUB 1000
.
.
.
G 23;
(NC PROGRAM)
.
.

I claim:

1. A numerical control device for controlling an object (7) by a numerical control system, comprising:
   means for inputting in a single flow a machining program including NC language instructions and general purpose high level language instructions;
   control section means (3') for interpreting said instructions inputted by said inputting means and setting NC instruction data as an NC data table in the order the instructions are inputted; and
   output section means (6) for applying said NC instruction data set by said control section to said object under control;
   wherein said control section means comprises:
   language discriminating section means receiving said instructions (31) for discriminating languages used for forming said program;
   NC language interpreting means coupled to said language discriminating section means (33) for interpreting and processing machine programs of NC language instructions which are discriminated by language by said language discriminating section and for forming NC instruction data;
   high level language interpreting means coupled to said language discriminating section means (32) for interpreting and processing a machining program of high level language instructions which are discriminated by language by said language discriminating means and for forming said NC language data; and
   NC data table forming means coupled to said NC language interpreting means and said high level language interpreting means (34) for forming said NC instruction data formed by said NC interpreting means and said NC instruction data formed by said high level language interpreting means into NC instruction data in the form of a data table in the order in which said language instructions are inputted.

2. A numerical control device as claimed in claim 1, wherein said language discriminating means in said control means comprises means for determining whether high level language processing is being effected, and for determining whether an inputted machining program comprises a high level language start delimiter instruction and for determining whether said inputted machine program comprises a high level language end delimiter instruction, said high level language start and end delimiter instructions bracketing a set of a selected number of said higher level language instructions in said flow of said inputted machining program and wherein said NC and high level language interpreting means do not interpret nor process said high level language start and end delimiter instructions.

3. A numerical control device as claimed in claim 2, wherein said control means determines whether high level language processing is being effected according to the state of a high level language processing flag within said control means.

4. A numerical control device as claimed in claim 3, wherein said determining means in said language discriminating means determine whether said inputted machining program input comprises said high level language end delimiter instruction only when said high level language processing is being effected.

5. A numerical control device as claimed in claim 4, wherein said language discriminating means comprises means for turning off said high level language processing flag in response to a high level language end delimiter instruction.

6. A numerical control device as claimed in claim 5, wherein said language discriminating means comprises means for controlling said high level language interpreting means to operate when a machining program inputted is not a high level language end delimiter instruction.

7. A numerical control device as claimed in claim 3, wherein said determining means in said language discriminating means determines whether a machining program inputted is a high level language start delimiter instruction only when said high level language processing is not being effected.

8. A numerical control device as claimed in claim 7, wherein said language discriminating means comprises means for turning on said high level language processing flag when a machining program is a high level language start delimiter instruction.

9. A numerical control device as claimed in claim 8, wherein said language discriminating means comprises means for controlling said NC language interpreting means to operate when a machining program is not a high level language start delimiter instruction.

10. A numerical control device as claimed in claim 1 wherein said object is a machine tool.

11. A numerical control device as claimed in claim 1, wherein said high level language is a BASIC language.

12. A numerical control device as claimed in claim 1, wherein at least some of said high level language instructions include an operator, a variable operand and a constant operand.

* * * * *